April 1, 1958

K. DAMIJONAITIS 2,828,784

SAW BLADE GUARD FOR POWER DRIVEN PORTABLE
CIRCULAR SAW WITH TILTABLE TABLE

Filed Oct. 17, 1956

INVENTOR.
KESTUTIS DAMIJONAITIS
BY
Lindsey and Prutzman
ATTORNEYS

April 1, 1958

K. DAMIJONAITIS 2,828,784

SAW BLADE GUARD FOR POWER DRIVEN PORTABLE
CIRCULAR SAW WITH TILTABLE TABLE

Filed Oct. 17, 1956

INVENTOR.
KESTUTIS DAMIJONAITIS
BY
Lindsey and Prutzman
ATTORNEYS

April 1, 1958

K. DAMIJONAITIS 2,828,784

SAW BLADE GUARD FOR POWER DRIVEN PORTABLE
CIRCULAR SAW WITH TILTABLE TABLE

Filed Oct. 17, 1956

INVENTOR.
KESTUTIS DAMIJONAITIS
BY
*Lindsey and Prutzman*
ATTORNEYS

United States Patent Office 2,828,784
Patented Apr. 1, 1958

2,828,784

SAW BLADE GUARD FOR POWER DRIVEN PORTABLE CIRCULAR SAW WITH TILTABLE TABLE

Kestutis Damijonaitis, Newington, Conn., assignor to The Stanley Works, New Britain, Conn., a corporation of Connecticut Application October 17, 1956, Serial No. 616,420

3 Claims. (Cl. 143—159)

This invention relates to a novel and improved saw blade guard for use with portable circular power saws.

In portable power saws of the type having a housing or casing containing an electric motor, a rotatable saw blade driven by the motor, and a tilting table or base on the housing to support the saw, it is usual to provide a fixed saw blade guard on the housing disposed above the table to protect the operator from injury from the rotating blade. It is further common practice in saws of this type to provide a pivoted lower blade guard extending below the table for the same purpose as the aforementioned upper blade guard. The forward edge of the lower guard is initially engageable with the work, as the saw is moved into cutting engagement therewith, to pivot the lower guard and permit passage of the saw blade through the work.

Such lower blade guards, heretofore available, have proved to be generally satisfactory for straight cuts; however, the previously developed lower guards tend to hang-up or resist rotation upon initial engagement with the work when the saw is used for a bevel cut and particularly when the saw is used for a compound cut. With certain lower guards, the guard will pivot when the saw is set for a compound cut if the guard is pressed against the work with considerable force; however, under such conditions, the saw will normally creep laterally of the direction of the cut as the guard pivots, thus resulting in an inaccurate cut.

In order to overcome such hang-up and creep, some lower guards are provided with handles whereby the user of the saw may manually initiate pivoting of the guard, while other guards are connected by linkage to the tilting table of the saw whereby when the table is set for a bevel cut, the guard is automatically pivoted a predetermined amount in an opening direction to provide easier initial pivoting upon engagement of the guard with the work. Both of these methods, of course, result in an undesirable reduction in the safety features of the guard.

Accordingly, it is an object of this invention to provide for a saw of the type described, a lower blade guard having a novel work engaging portion whereby the guard will be automatically pivoted upon initial engagement of the guard with the work regardless of the setting of the saw up to and including 45 degrees of miter or bevel or a combination thereof, without sacrificing any of the safety features of the guard available when the saw is set for a straight cut.

It is another object of this invention to provide a guard of the type described which will operate within the ranges specified without resulting in any lateral movement or creep of the saw.

It is still another object of this invention to provide a guard of the type described which will operate equally satisfactory for any depth of cut setting of the saw within the depth of cut range of the saw.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
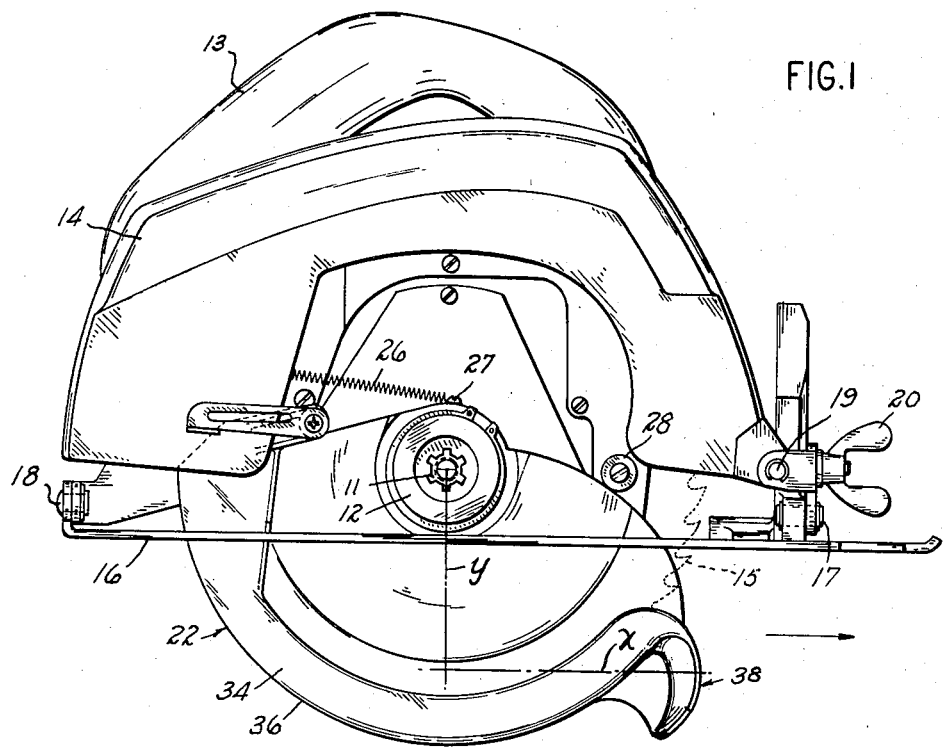
Fig. 1 is a side elevational view of a portable power saw having a lower blade guard incorporating the invention.
Figure 2:
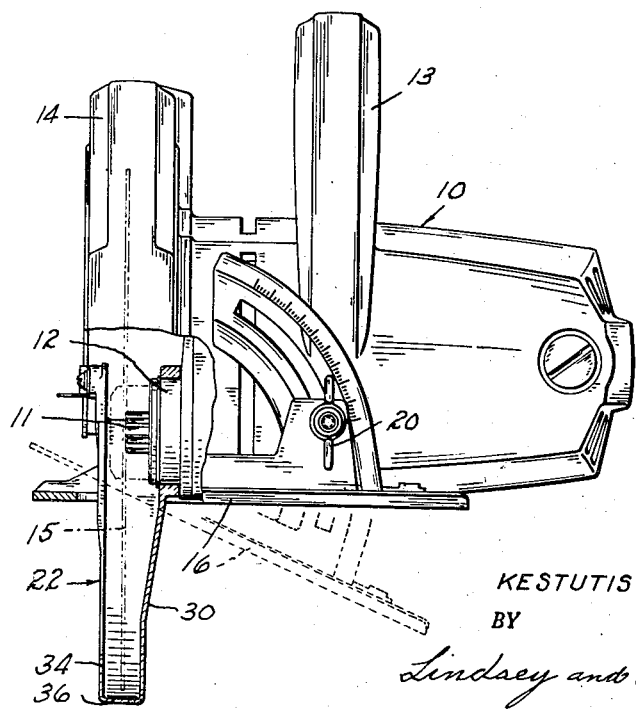
Fig. 2 is a front elevational view of the saw of Fig. 1 with the lower blade guard vertically sectioned.

With reference to the drawings and particularly Figs. 1 and 2, there is shown a portable electric saw of generally well known construction comprising a housing 10 in which is contained an electric motor having an arbor 11 journalled in a hub 12 on the body. A handle 13 is mounted on the motor housing 10 for the carrying and manipulation of the saw. An upper guard 14 is mounted on the housing 10 and is channel-shaped in cross section to accommodate the upper portion of the periphery of the blade 15. A table or base 16 is pivotally mounted on the upper guard 14 and 17 and 18 for tilting movement, as shown in dotted lines in Fig. 2, to permit bevel cutting. The table 16 is further pivotally mounted at 19 to permit pivotal movement in the plane of the saw blade and allow adjustment of the table for the depth of cut desired. Suitable means are provided as at 20 to secure the table 16 in the desired tilted position for bevel cutting and other suitable means (not shown) are provided to secure the table in the proper pivoted position for the depth of cut desired.

As shown in Fig. 1, a lower blade guard 22 is rotatably mounted on the hub 12 for pivotal movement about the axis of rotation of the saw blade between a closed portion, as shown in Fig. 1, and an open position wherein the guard has been rotated in a clockwise direction, as viewed in Fig. 1, into telescoping relationship with the upper guard 14. With particular reference to Figs. 3–6, the lower guard 22 is comprised of a plate member 30 generally in the form of a segment of a circle, having a channel-shaped saw blade receiving portion comprising a rim 34 and a flange 36 spaced axially of the plate member 30. A spring 26 as shown in Fig. 1, which is connected at one end to the guard 22 as at 27 and at the other end fixed in a suitable manner to the upper guard 14 biases the lower guard 22 in a counterclockwise closing direction. A stop member 28, preferably in the form of a rubber bushing, is fixed on the upper guard and serves to limit the counterclockwise movement of the lower guard 22.

Figure 6:
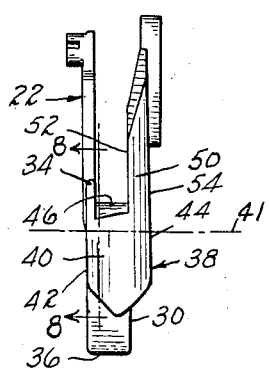
Fig. 6 is a front elevational view of the guard of Fig. 5.
Figure 7:
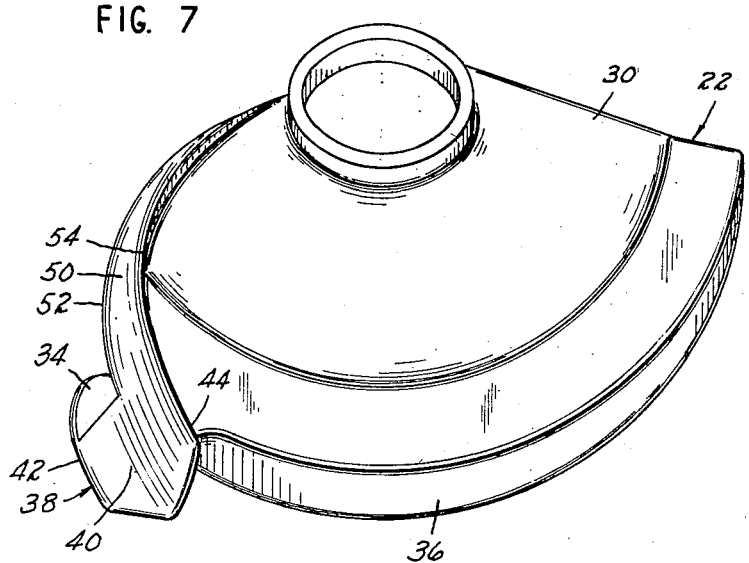
Fig. 7 is a perspective view of the guard.

In accordance with the invention, the guard 22 is provided with a nose portion 38 extending forwardly of the main portion of the guard and, as can be most clearly seen in Figs. 3 to 7, the nose 38 is comprised of a three-dimensional work engageable surface 40 extending across the saw blade receiving plane of the guard. As can be seen in Figs. 3 to 7, the surface 40 is curved convexly upwardly and rearwardly of the guard in planes normal to the pivotal axis of the guard, and is also convexly curved transversely and rearwardly of the guard from an outer edge 42 to an inner edge 44. In the preferred embodiment, the forward portion of the nose 38 is tapered from the lower ends of the outer and inner edges 42, 44 as shown in Figs. 6 and 7 and the rim 34 of the guard is smoothly merged into the nose portion as shown at 46 in Fig. 6.

Figure 8:
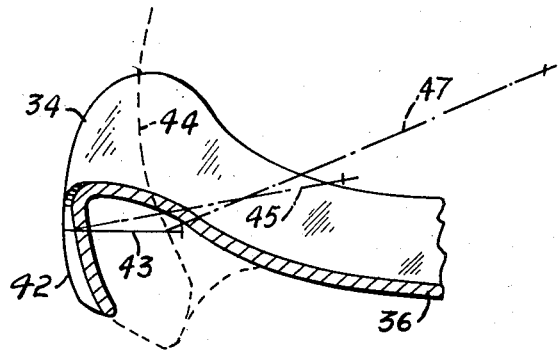
Fig. 8 is an enlarged fragmentary view of the guard substantially along the line 8—8 of Fig. 6.

As illustrated in Figs. 6 and 8, the radius of curvature of corresponding points between the outer edge 42 of the nose portion and inner edge 44, such as those points lying on the line 41 of Fig. 6, increases from the outer edge toward the inner edge; for example, as shown in Fig. 8, a radius 43 of the outer edge 42 is less than the radius of curvature 45 of a corresponding point intermediate the outer and inner edges and the radius 47 at a corresponding point on the inner edge 44 of the nose portion is greater than the radius 45.

The plate member 30 is further provided about a portion of its forward periphery with a supplemental three-dimensional work-engageable surface 50 which is convexly curved upwardly and rearwardly from the upper and inner end of the nose portion 40 and which is also convexly curved transversely and rearwardly of the guard from an outer edge 52 disposed intermediate the outer edge 42 and inner edge 44 of the nose portion, to an inner edge 54 lying in the same plane as the inner edge 44 of the nose portion. As can be most clearly seen in Fig. 7, the supplemental work-engageable surface 50 forms a continuation of a portion of the nose 38 and is disposed in its entirety on the same side of the saw blade receiving plane of the guard as the inner edge 44 of the nose 38.

In the use of a saw having a lower guard constructed in accordance with the invention and with the saw set for a straight cut, the locus of contact of the guard and work will be along the outer edge 42 of the nose portion and the outer edge 52 of the supplemental work-engaging surface 50. With the saw set for a miter, bevel or compound cut, the locus of contact of the guard and work will be intermediate the planes of the outer and inner edge of the nose portion and the outer and inner edges of the supplemental work-engaging surface 50.

Figure 3:
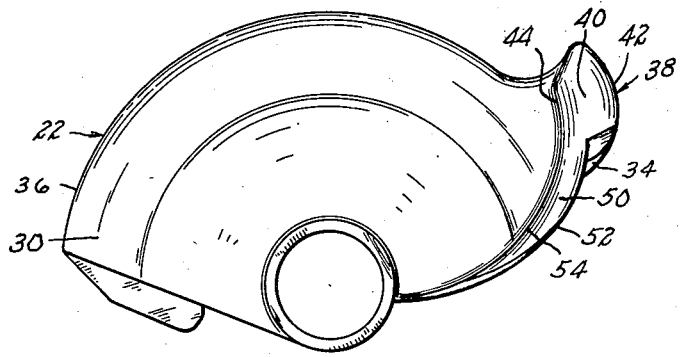
Fig. 3 is an inverted side elevational view of a lower saw blade guard constructed in accordance with the invention.
Figure 4:
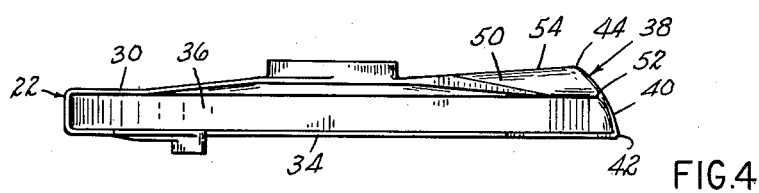
Fig. 4 is a top view of the guard of Fig. 3.
Figure 5:
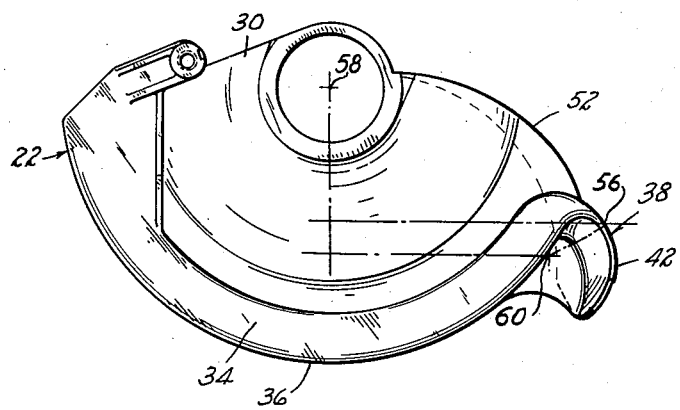
Fig. 5 is a side elevational view of the guard of Fig. 4.

In accordance with the invention, the contour of the work-engageable surfaces 40 and 50, which approaches an involute curve in planes normal to the axis of the guard, is such that at any point on the surface other than at the outer or inner edges thereof, the center of curvature of the surface is spaced from the plane of rotation axially of the guard. The radii of curvature of the surfaces 40 and 50, as can be seen in Figs. 3–4 vary along the length and breadth of the surfaces. These radii are selected to provide, as shown, by way of example, in Fig. 5 in connection with the outer edge 42 of the nose 38, that for any given bevel or miter setting of the saw up to and including 45° and for any depth of cut setting within the range of the saw, the point 56 of initial engagement of the saw guard with the work will be spaced vertically, relative to the center of rotation 58 of the guard, a distance no greater than the vertical spacing of the center of curvature 60 of the guard, at said initial point of contact. This novel construction of the guard assures that the initial engagement of the guard and work will, at any setting of the saw within the ranges specified above, impose a clockwise pivoting force on the guard, as viewed in Fig. 5, sufficient to cause the guard to be moved in an opening direction.

In the use of a guard constructed in accordance with the invention, it has been found that it is preferable to locate the stop member 28 heretofore described so that the forwardmost point on the guard initially engageable with the work when the saw is set for a straight cut will, in the plane of rotation of the guard, have a vertical ordinate $y$ to horizontal ordinate $x$ ratio relative to the guard axis of at least .75 in order to assure smooth opening movement of the guard at all saw settings.

Thus, it can be seen that there has been provided a novel saw guard which will, upon initial engagement of the guard and work assure a smooth opening of the guard without the necessity of manually starting the opening movement and without the necessity of pressing the guard against the work with excessive force. The near involute upward and reraward curvature of the work-engaging surfaces 40 and 50 of the guard assures an even rolling contact of the guard and work to encourage easy opening of the guard. The three-dimensional curvature of the nose also assures a point contact with the work to minimize frictional engagement therewith and further encourages easier opening of the guard.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A saw guard for use with a circular saw blade of a portable power saw having means to dependingly mount the guard for limited rotation about the axis of the saw blade, a nose portion at the forward end of the guard extending transversely across the saw blade receiving plane of the guard and having a relatively wide three-dimensional work-engaging surface convexly curved upwardly and rearwardly and also convexly curved transversely and rearwardly of the guard from the outer edge to the inner edge of the nose portion, the guard also having a supplemental work-engaging surface of lesser width than said nose portion convexly curved upwardly and rearwardly of the guard from the upper and inner end of the nose portion and also convexly curved transversely and rearwardly of the guard to form a continuation of a portion of said nose portion, said supplemental work-engaging surface being disposed entirely on the same side of the saw blade receiving plane as said inner edge of the nose portion.

2. A saw guard for use with a circular saw blade of a portable power saw having means to dependingly mount the guard for limited rotation about the axis of the saw blade, a nose portion at the forward end of the guard extending transversely across the saw blade receiving plane of the guard and having a relatively wide three-dimensional work-engaging surface convexly curved upwardly and rearwardly of the guard and also convexly curved transversely and rearwardly of the guard from the outer edge to the inner edge of the nose portion, said outer edge at any one point thereon having a radius of curvature which is substantially less than the radius of curvature of said inner edge at a corresponding point thereon, the guard also having a supplemental work-engaging surface of lesser width than said nose portion convexly curved upwardly and rearwardly of the guard from the upper and inner end of the nose portion and also convexly curved transversely and rearwardly of the guard to form a continuation of a portion of said nose portion, said supplemental work-engaging surface being disposed entirely on the same side of the saw blade receiving plane as said inner edge of the nose portion.

3. A saw guard for use with a circular saw blade of a portable power saw comprising a plate member having means for mounting on the guard or the saw for limited rotation thereof about the axis of the saw blade, a rim about a portion of the periphery of the plate member, a flange on the rim spaced from the plate member and disposed generally parallel thereto, and a nose portion on the forward portion of the guard integral with said plate member, rim and flange and comprising a three-dimensional work-engageable surface convexly curved upwardly and rearwardly and also convexly curved transversely and rearwardly of the guard from the outer edge to the inner edge of the nose portion, said outer edge of the nose portion lying in the same plane as said flange, the guard also having a supplemental work-engaging surface of lesser width than said nose portion convexly curved upwardly and rearwardly of the guard from the upper and inner end of the nose portion and also convexly curved transversely and rearwardly of the guard to form a continuation of a portion of said nose portion, said inner edge of the supplemental work-engaging surface lying in the same plane as said inner edge of the nose portion.

References Cited in the file of this patent

UNITED STATES PATENTS

| | | |
|---|---|---|
| 2,346,961 | Gundelfinger et al. | Apr. 18, 1944 |
| 2,488,947 | Vavrik | Nov. 22, 1949 |
| 2,657,719 | Forsberg | Nov. 3, 1953 |
| 2,671,476 | Richards et al. | Mar. 9, 1954 |